(12) United States Patent
Gradington et al.

(10) Patent No.: US 8,308,233 B1
(45) Date of Patent: Nov. 13, 2012

(54) BICYCLE PASSENGER SEAT AND ASSOCIATED METHOD

(76) Inventors: Edward Gradington, Bryan, TX (US);
Dianne Gradington, Bryan, TX (US)

( * ) Notice: Subject to any disclaimer, the term of this patent is extended or adjusted under 35 U.S.C. 154(b) by 83 days.

(21) Appl. No.: 12/858,166

(22) Filed: Aug. 17, 2010

Related U.S. Application Data

(60) Provisional application No. 61/234,358, filed on Aug. 17, 2009.

(51) Int. Cl.
*B60N 2/38* (2006.01)
*B60N 2/40* (2006.01)
*B62J 1/00* (2006.01)
*B62J 1/08* (2006.01)

(52) U.S. Cl. ......... 297/195.12; 297/215.13; 297/215.14; 297/243; 280/202

(58) Field of Classification Search ............ 297/195.12, 297/215.13, 215.14, 243; 280/202
See application file for complete search history.

(56) References Cited

U.S. PATENT DOCUMENTS

| | | | | |
|---|---|---|---|---|
| 571,302 A * | 11/1896 | De Rome | ...................... | 280/202 |
| 596,786 A * | 1/1898 | Olyphant, Jr. | ................ | 280/202 |
| 605,699 A * | 6/1898 | Cowden | ..................... | 280/202 |
| 606,389 A * | 6/1898 | Morse | ........................... | 280/202 |
| 615,783 A * | 12/1898 | Batchelder | .................... | 280/202 |
| 618,195 A * | 1/1899 | Zack | .............................. | 280/202 |
| 645,668 A * | 3/1900 | Lemoon | ........................ | 280/202 |
| 924,541 A * | 6/1909 | Duck | ............................. | 280/202 |
| 1,013,007 A * | 12/1911 | Fowler et al. | ................. | 280/202 |
| 1,066,324 A * | 7/1913 | Robeson | ....................... | 280/202 |
| 1,082,227 A * | 12/1913 | Gates et al. | .................... | 280/202 |
| 1,102,899 A * | 7/1914 | Fox | ............................. | 297/243 X |
| 1,279,260 A * | 9/1918 | Chilson | ................. | 297/195.12 X |
| 1,451,651 A * | 4/1923 | Crysdale | ..................... | 280/202 X |
| 1,469,742 A * | 10/1923 | Vetter | ........................... | 280/202 |
| 1,565,016 A * | 12/1925 | Lake, Jr. | ....................... | 280/202 |
| 1,709,538 A * | 4/1929 | Persons | ......................... | 280/202 |
| 1,717,056 A * | 6/1929 | Mesinger | ...................... | 280/202 |
| 2,234,299 A * | 3/1941 | Christy | ......................... | 280/202 |
| 2,320,344 A * | 6/1943 | Belanger | ....................... | 280/202 |
| 3,486,727 A * | 12/1969 | Timms | ................. | 297/215.13 X |
| 3,531,138 A * | 9/1970 | Sorensen | .................. | 297/243 X |
| 3,549,172 A * | 12/1970 | McBroom et al. | ............ | 280/202 |
| 3,603,609 A * | 9/1971 | Hott et al. | ............ | 297/215.14 X |
| 3,619,003 A * | 11/1971 | Rich, Jr. | ........................ | 297/243 |
| 3,625,405 A * | 12/1971 | Kezar et al. | ............... | 280/202 X |
| 3,640,548 A * | 2/1972 | Worley | ................. | 297/215.13 X |
| 3,653,679 A | 4/1972 | Howard | | |
| 3,746,392 A * | 7/1973 | German | .................... | 297/243 X |
| 3,802,598 A * | 4/1974 | Burger et al. | ................. | 280/202 |
| 3,873,127 A * | 3/1975 | McNichol et al. | ........... | 280/202 |
| 3,970,345 A * | 7/1976 | Holcomb | .................. | 297/243 X |
| 4,022,488 A * | 5/1977 | Likas | ........................... | 280/202 |

(Continued)

*Primary Examiner* — Rodney B White

(57) ABSTRACT

A bicycle passenger seat may include a mounting bracket adapted to be attached to an existing pole of an operator seat pole of an existing bicycle. A support frame may be pivotally attached to the mounting bracket and adapted to be selectively coupled to an axle of the rear wheel of the existing bicycle. A stud bolt is removably connected to the support frame. Passenger handles are removably attached to axially opposed ends of the stud bolt. A passenger seat may further be coupled to a posterior end of the support frame. The horizontal length of the support frame may be selectively adjustable along an x-axis while the vertical length may be selectively adjustable along a y-axis. In this manner, the combined weight of the operator and passenger is more evenly distributed so that a center of mass is forwardly spaced from the rear wheel of the bicycle.

12 Claims, 4 Drawing Sheets

U.S. PATENT DOCUMENTS

| | | | |
|---|---|---|---|
| 4,026,448 A * | 5/1977 | Lewis | 297/243 X |
| 4,030,648 A * | 6/1977 | Johnson et al. | 297/243 X |
| 4,051,985 A * | 10/1977 | Berger | 297/243 X |
| 4,053,091 A * | 10/1977 | Martelet | 297/243 X |
| 4,085,968 A * | 4/1978 | Svensson et al. | 297/243 |
| 5,370,441 A * | 12/1994 | Chuang | 297/243 X |
| D379,782 S | 6/1997 | Adams | |
| 5,836,600 A | 11/1998 | Chiu | |
| 6,644,677 B1 * | 11/2003 | Rose | 297/243 X |
| 7,147,281 B2 * | 12/2006 | Michisaka et al. | 297/195.12 X |
| 2010/0013187 A1 * | 1/2010 | Oxley | 280/202 X |
| 2010/0187873 A1 * | 7/2010 | Geyer et al. | 297/215.13 |

* cited by examiner

BICYCLE PASSENGER SEAT AND ASSOCIATED METHOD

CROSS REFERENCE TO RELATED APPLICATIONS

This application claims the benefit of U.S. Provisional Application No. 61/234,358, filed Aug. 17, 2009, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to bicycle accessories and, more particularly, to a bicycle passenger seat for providing users with an easy and convenient means of assisting a passenger to sit behind an operator of an existing bicycle 2. Prior Art One of the most popular recreational activities enjoyed by Americans is bicycling. According to statistics provided by the National Sporting Goods Association, an estimated 41 million people participated in some form of bicycle riding in the United States during the year 2005. A form of relaxation, pedaling slowly down the street can help a rider wind down after a stressful day. On the other hand, many find bicycles to be the perfect instruments of fitness and sport. Providing a healthy, cardiovascular workout as well as a great way to tone one's muscles, streaking down bike trails has become a favored form of exercise for those concerned with their physical well-being. Additionally, sports enthusiasts relish the frenetic energy of competitive bicycle races, from local track contests to cross country triathlons. Whether it is to simply relax, get fit, or just have fun, bicycling provides riders with an enjoyable way to experience the outdoors.

Perhaps the ones who enjoy bicycles the most are children. From pedaling their first tricycle through the front yard to spiriting down the street on a two wheeler, these devices are children's first means of experiencing the thrill of fast mobility. Indeed, it is not uncommon to pass through neighborhoods and see dozens of children riding their bikes on beautiful sunny days. Many times children share their bikes with friends who may not own a bicycle, either by letting the friend ride theirs or allowing the buddy to share the seat, with both riders on at the same time. However, this practice can prove unwieldy and dangerous. Since the passenger typically wraps his or her arms around the rider for support, this constriction to the rider can make navigation of the bicycle difficult. In such a situation, the rider can easily lose control of the bike, causing the passenger to lose their tenuous hold and go sailing off the unit and onto the ground. As a result, both rider and passenger risk serious injury when sharing one bicycle.

Accordingly, a need remains for an apparatus in order to overcome the above-noted shortcomings. The present invention satisfies such a need by providing a bicycle passenger seat that is convenient and easy to use, lightweight yet durable in design, versatile in its applications, and designed for assisting a passenger to sit behind an operator of an existing bicycle.

BRIEF SUMMARY OF THE INVENTION

In view of the foregoing background, it is therefore an object of the present invention to provide an apparatus for assisting a passenger to sit behind an operator of an existing bicycle. These and other objects, features, and advantages of the invention are provided by a bicycle passenger seat.

The bicycle passenger seat may include a mounting bracket adapted to be attached to the existing pole of an operator seat pole of an existing bicycle. A support frame may be pivotally attached to the mounting bracket and adapted to be selectively coupled to an axle of a rear wheel of the existing bicycle. A stud bolt may be removably connected to the support frame. A plurality of passenger handles may be removably attached to axially opposed ends of the stud bolt. A passenger seat may further be coupled to a posterior end of the support frame.

The horizontal length of the support frame may be selectively adjustable along an x-axis while the vertical length may be selectively adjustable along a y-axis. Such a structural arrangement provides the unexpected and unpredictable advantage of adjustably attaching the bicycle passenger seat to the existing bicycle. The operator seat pole and the axle of the bicycle rear wheel may provide a rigid and stable support to the bicycle passenger seat and the removable passenger handles may further provide support for the bicycle passenger to hold on to without the risk of falling from the bicycle.

The passenger handles may be situated intermediately between the mounting bracket and the passenger seat. Such an arrangement provides the unexpected and unpredictable advantage of having the bicycle passenger to conveniently hold onto the passenger handles and not onto the body of the bicycle operator. In this way, the bicycle operator may ride on the bicycle without being distracted by the passenger's hands holding onto his body.

The support frame may include an adjustable horizontal frame section adjustable along the x-axis. Such an adjustable horizontal frame section may include an anterior end preferably having first and second tubular shafts directly and pivotally connected to the mounting bracket. Such an anterior end may be selectively pivoted above and below the x-axis and may further extend rearwardly from the mounting bracket along the x-axis. The adjustable horizontal frame section may further include a posterior end preferably having first and second tubular rods telescopically interfitted directly within the first and second shafts respectively. Such first and second rods may extend rearwardly from the first and second shafts and along the x-axis such that the stud bolt may traverse through the first and second shafts and the first and second rods respectively. Such an arrangement provides the unexpected and unpredictable advantage of adjusting the apparatus to accommodate a variety of passengers with different weights and heights in a rigid and strong manner. For example, the passenger seat may be adjusted closer to the bicycle operator for a child while the distance may be spaced further away for an adult.

The first and second shafts may diverge rearwardly and away from the mounting bracket such that the first and second rods may diverge rearward and away from the stud bolt and terminate adjacent to the passenger seat. Such an arrangement provides the unexpected and unpredictable advantage of spacing the first and second shafts and first and second rods away from the rear wheel of the bicycle respectively.

The passenger handles may be registered orthogonal to the x-axis and remains disposed anterior of the first and second rods respectively. Such an arrangement provides the unexpected and unpredictable advantage of aligning the bicycle passenger's body with the operator's body when in use. One skilled in the art may appreciate that a bicycle passenger has the tendency to move his body away from the direction of travel of a moving vehicle and in such situations may cause the bicycle operator to lose his balance when negotiating corners for example.

The support frame may include an adjustable vertical frame section adjustable along the y-axis. Such an adjustable vertical frame section may include a bottom end preferably having first and second support beams directly and statically connected to the first and second shafts rods of the posterior end of the support frame respectively. The first and second support beams may further extend rearwardly away from the posterior end and along the y-axis. The support frame vertical frame section may further include an upper end preferably having first and second poles telescopically interfitted directly within the first and second beams respectively and further extending upwardly from the first and second beams. The first and second poles may further be directly coupled to the passenger seat. Such an arrangement further provides the unexpected and unpredictable advantage of adjusting the apparatus wherein the telescopic first and second poles may be adjusted upwardly to accommodate tall passengers.

The invention may include a method of utilizing a bicycle passenger seat for assisting a passenger to sit behind an operator of an existing bicycle. Such a method may include the chronological steps of: providing and attaching a mounting bracket to an existing pole of an operator seat pole of the existing bicycle; providing and pivotally attaching a support frame to the mounting bracket; selectively coupling the support frame to an axle of a rear wheel of the existing bicycle; providing and removably connecting a stud bolt to the support frame; providing and removably attaching a plurality of passenger handles to axially opposed ends of the stud bolt; providing and coupling a passenger seat to a posterior end of the support frame; selectively adjusting a horizontal length of the support frame along an x-axis; selectively adjusting a vertical length of the support frame along a y-axis.

The method may further include the steps of: providing for a passenger sitting on the passenger seat and gripping the passenger handles; and providing for the operator sitting on the operator seat and pedaling the bicycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
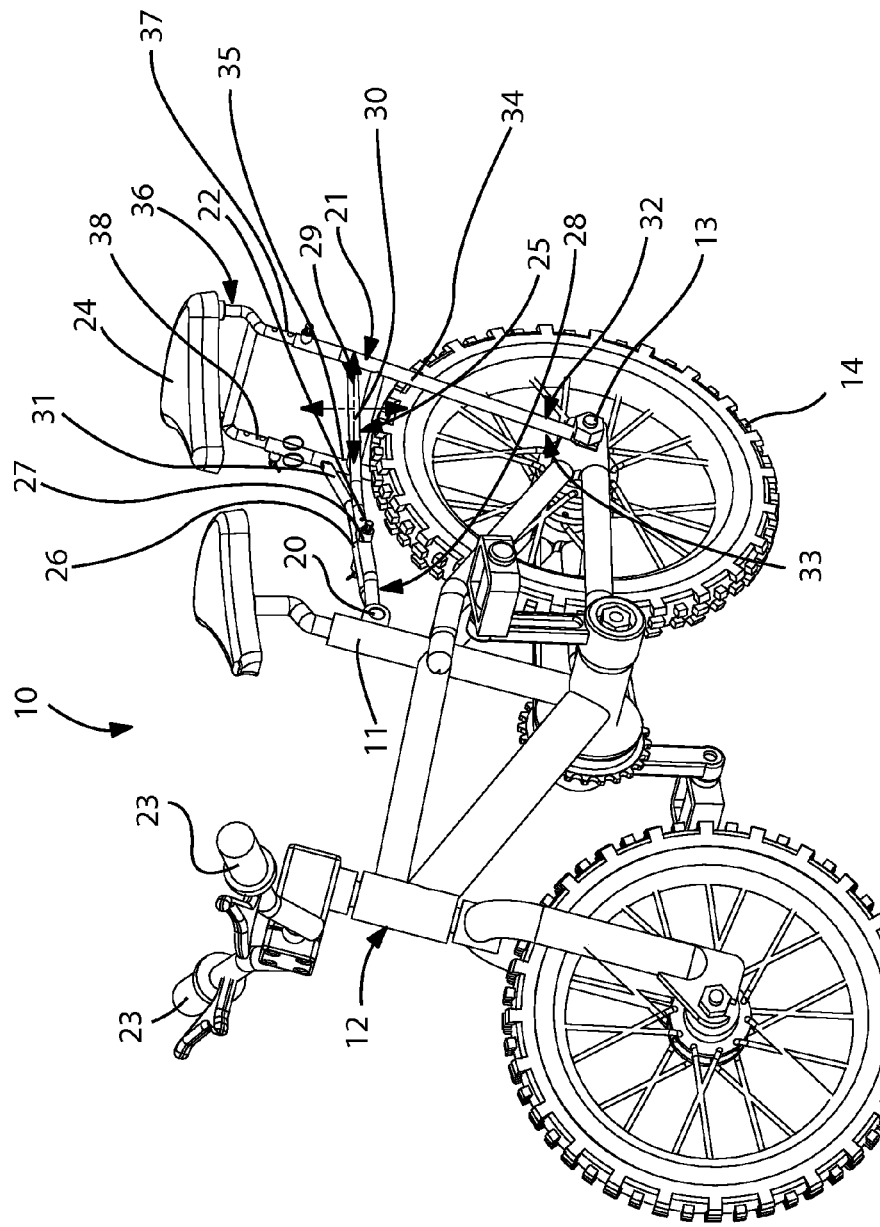
FIG. 1 is a perspective view showing a bicycle passenger seat attached to an existing bicycle, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The apparatus of this invention is referred to generally in FIGS. 1-4 and is intended to provide a bicycle passenger seat. It should be understood that the present invention may be used to accommodate many different types of bicycles and the like, and should not be limited to the uses described herein.

Referring generally to FIGS. 1-4, the bicycle passenger seat 10 may include a mounting bracket 20 adapted to be attached to an existing pole 11 of the operator seat pole of an existing bicycle 12. A support frame 21 may be pivotally attached to the mounting bracket 20 and adapted to be selectively coupled to an axle 13 of a rear wheel 14 of the existing bicycle 12. Referring to FIG. 1 in detail, a stud bolt 22 may be removably connected to the support frame 21. A plurality of passenger handles 23 may be removably attached to axially opposed ends of the stud bolt 22. A passenger seat 24 may further be coupled to a posterior end 29 of the support frame 21.

Figure 2:
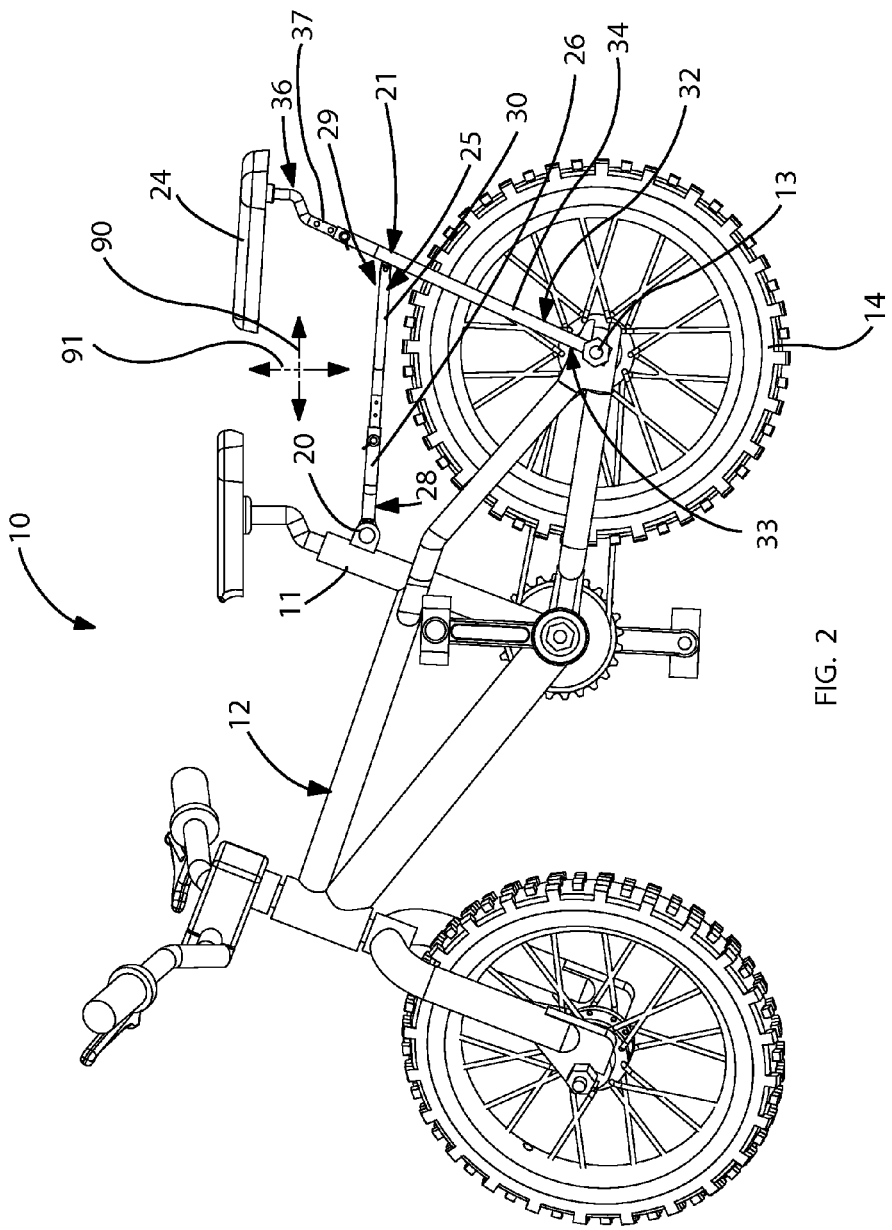
FIG. 2 is a side elevational view of the apparatus with the adjustable horizontal and vertical frame sections in an extended position.
Figure 3:
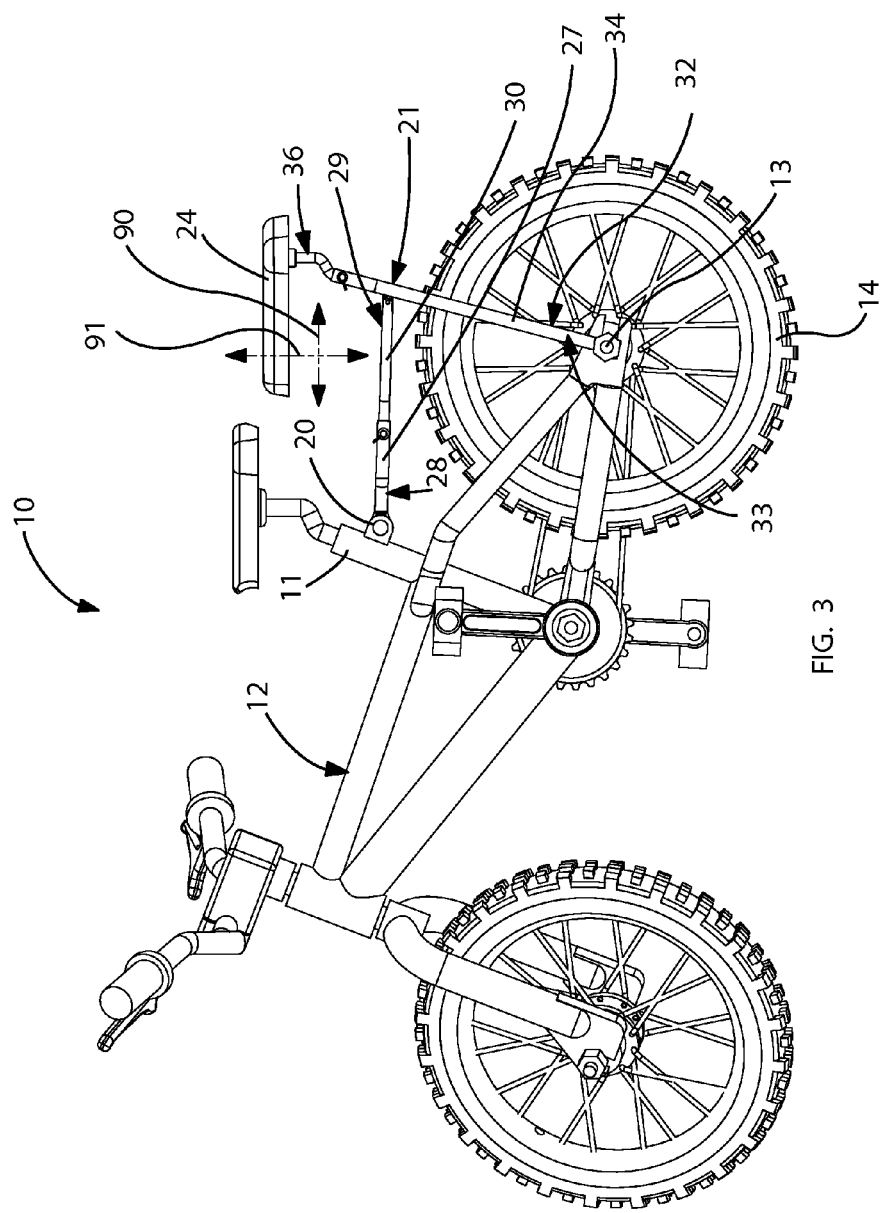
FIG. 3 is a side elevational view of the apparatus with the adjustable horizontal and vertical frame sections in a retracted position.
Figure 4:
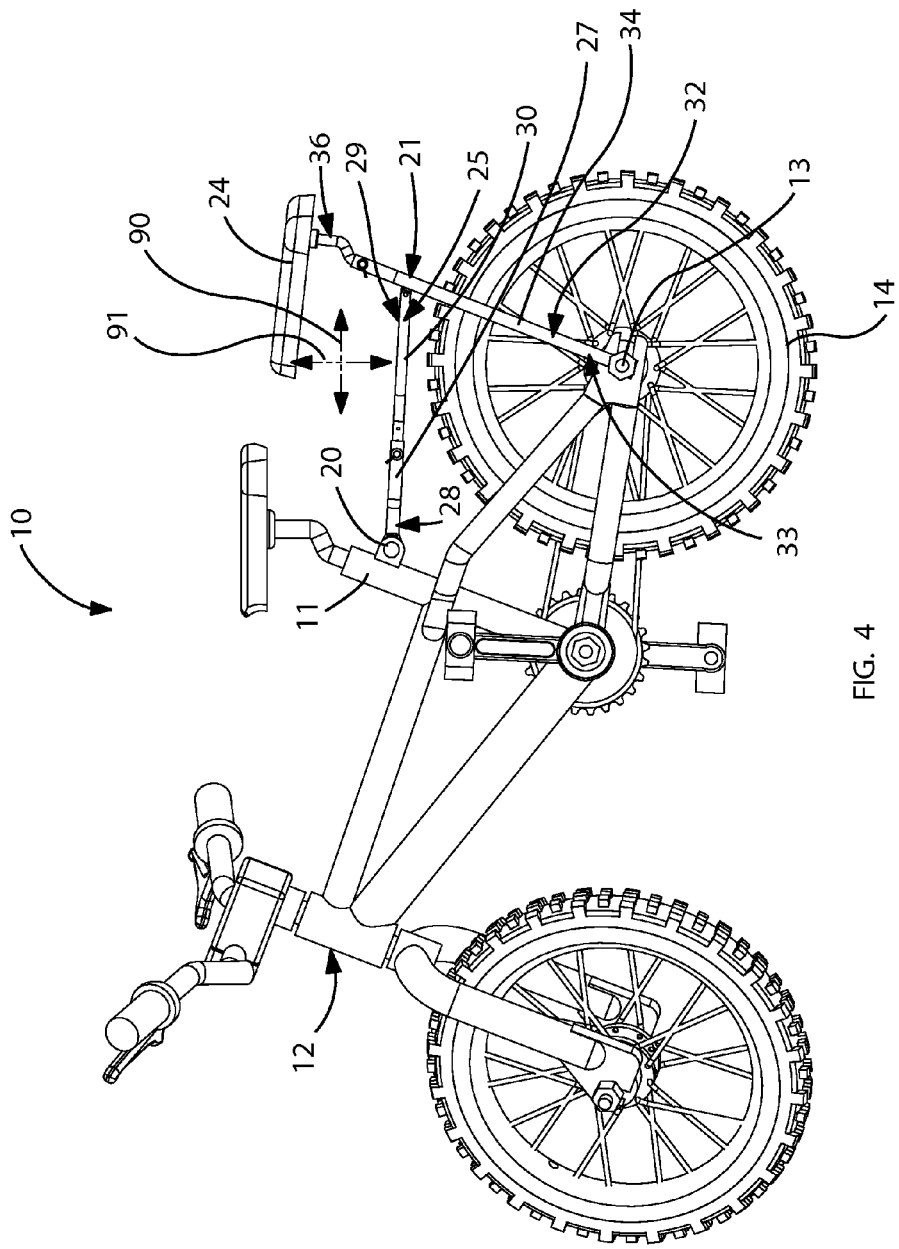
FIG. 4 is a side elevational view of the apparatus with the adjustable horizontal section in an extended position and the adjustable vertical section in a retracted position.

As shown in FIGS. 2-4, the horizontal length of the support frame 21 may be selectively adjustable along an x-axis 90 while the vertical length may be selectively adjustable along a y-axis 91. Such a structural arrangement provides the unexpected and unpredictable advantage of adjustably attaching the bicycle passenger seat 10 to the existing bicycle 12 such that a combined center of mass of both the operator and passenger can be distributed forwardly of rear wheel 14. The operator seat pole 11 and the axle 13 of the bicycle rear wheel 14 may provide a rigid and stable support to the bicycle passenger seat 10 and the removable passenger handles 23 may further provide support for the bicycle passenger to hold on to without the risk of falling from the bicycle 12. By encouraging the passenger to grip handles 23, the passenger leans forward and distributes his/her weight closer to pole 11 than axle 13.

Referring to FIG. 1, the passenger handles 23 may be situated intermediately between the mounting bracket 20 and the passenger seat 24. Such an arrangement provides the unexpected and unpredictable advantage of having the bicycle passenger to conveniently hold onto the passenger handles 23 and not onto the body of the bicycle operator. In this way, the bicycle operator may ride on the bicycle 12 without being distracted by the passenger's hands holding onto his body. Also, the combined weight of the operator and passenger is distributed forwardly and away from rear wheel 14.

As shown in FIGS. 2-4, the support frame 21 may include an adjustable horizontal frame section 25 adjustable along the x-axis 90. Such an adjustable horizontal frame section 25 may include an anterior end 28 preferably having first and second tubular shafts 26, 27 directly and pivotally connected to the mounting bracket 20. Such an anterior end 28 may be selectively pivoted above and below the x-axis 90 and may further extend rearwardly from the mounting bracket 20 along the x-axis 90. The adjustable horizontal frame section 25 may further include a posterior end 29 preferably having first and second tubular rods 30, 31 telescopically interfitted directly within the first and second shafts 26, 27 respectively. Such first and second rods 30, 31 may extend rearwardly from the first and second shafts 26, 27 and along the x-axis 90 such that the stud bolt 22 may traverse through the first and second shafts 26, 27 and the first and second rods 30, 31, respectively. Such a structural arrangement provides the unexpected and unpredictable advantage of adjusting the apparatus 10 to accommodate a variety of passengers with different weights and heights in a rigid and strong manner. Such an adjustment may be done while the operator seat and passenger seat 24 remain attached to the support frame 21. For example, the passenger seat 24 may be adjusted closer to the bicycle operator for a child while the distance may be spaced further away for an adult.

Referring now to FIGS. 2-3, the first and second shafts 26, 27 may diverge rearwardly and away from the mounting bracket 20 such that the first and second rods 30, 31 diverge rearward and away from the stud bolt 22 and terminate adjacent to the passenger seat 24. Such an arrangement provides the unexpected and unpredictable advantage of spacing the first and second shafts 26, 27 and first and second rods 30, 31 away from the rear wheel 14 of the bicycle 12, respectively. Such spacing converges the distribution of the passenger weight along a concentrated path leading to mounting bracket 20 wherein the load is absorbed and distributed throughout the lower portion of the bicycle 12.

Referring again to FIG. 1, the passenger handles 23 may be registered orthogonal to the x-axis 90 and remains disposed anterior of the first and second rods 30, 31 respectively. Such an arrangement provides the unexpected and unpredictable advantage of aligning the bicycle passenger's body with the operator's body when in use. A bicycle passenger has the tendency to move his body away from the direction of travel of a moving bicycle and in such situations may cause the bicycle operator to lose his balance when traveling around corners, for example.

Referring to FIGS. 1-4 again, the support frame 21 may include an adjustable vertical frame section 32 adjustable along the y-axis 91. Such an adjustable vertical frame section 32 may include a bottom end 33 preferably having first and second support beams 34, 35 directly and statically connected to the first and second rods 30, 31 of the posterior end 29 of the support frame 21 respectively. The first and second support beams 34, 35 may further extend rearwardly away from the posterior end 29 and along the y-axis 91. The vertical frame section 32 may further include an upper end 36 preferably having first and second poles 37, 38 telescopically interfitted directly within the first and second beams 34, 35, respectively, and further extending upwardly from the first and second beams 34, 35. The first and second poles 37, 38 may further be directly coupled to the passenger seat 24. Such an arrangement further provides the unexpected and unpredictable advantage of adjusting the apparatus 10 wherein the telescopic first and second poles 37, 38 may be adjusted upwardly to accommodate tall passengers.

The invention may include a method of utilizing a bicycle passenger seat 10 for assisting a passenger to sit behind an operator of an existing bicycle 12. Such a method may include the chronological steps of: providing and attaching a mounting bracket 20 to an existing pole 11 of an operator seat pole of the existing bicycle 12; providing and pivotally attaching a support frame 21 to the mounting bracket 20; selectively coupling the support frame 21 to an axle 13 of a rear wheel 14 of the existing bicycle 12; providing and removably connecting a stud bolt 22 to the support frame 21; providing and removably attaching a plurality of passenger handles 23 to axially opposed ends of the stud bolt 22; providing and coupling a passenger seat 24 to a posterior end 29 of the support frame 21; selectively adjusting a horizontal length of the support frame 21 along an x-axis 90; and selectively adjusting a vertical length of the support frame 21 along a y-axis 91.

The method may further include the steps of: a passenger sitting on the passenger seat 24 and gripping the passenger handles 23; and the operator sitting on the operator seat and pedaling the bicycle 12. The combination of such claimed elements provides an unpredictable and unexpected benefit of providing a stable and secure mechanism for a bicycle passenger to remain on a bicycle while riding. In this manner, the bicycle operator is unencumbered by the passenger and can better control the operation of the bicycle. In addition, the combined weight of the operator and passenger is better distributed and balanced along the bicycle which solves the problem of either the bicycle operator or the passenger falling off.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A bicycle passenger seat for assisting a passenger to sit behind an operator of an existing bicycle, said bicycle passenger seat comprising:
   a mounting bracket adapted to be attached to an existing pole of an operator seat pole of the existing bicycle;
   a support frame attached to said mounting bracket and adapted to be selectively coupled to an axle of a rear wheel of the existing bicycle;
   a stud bolt connected to said support frame;
   a plurality of passenger handles removably attached to said stud bolt; and
   a passenger seat coupled to said support frame;
   wherein a horizontal length of said support frame is selectively adjustable along an x-axis and a vertical length of said support frame is selectively adjustable along a y-axis;
   wherein said support frame comprises: an adjustable horizontal frame section adjustable along the x-axis, said adjustable horizontal frame section comprising
   an anterior end having first and second tubular shafts directly and pivotally connected to said mounting bracket such that said anterior end is selectively pivoted above and below the x-axis, said anterior end extending rearward from said mounting bracket along the x-axis; and
   a posterior end having first and second tubular rods telescopically interfitted directly within said first and second shafts respectively, such first and second rods extending rearward from said first and second shafts and along the x-axis;
   wherein said stud bolt traverses through said first and second shafts and said first and second rods respectively.

2. The bicycle passenger seat of claim 1, wherein said passenger handles are situated intermediately between said mounting bracket and said passenger seat.

3. The bicycle passenger seat of claim 1, wherein said first and second shafts diverge rearward and away from said mounting bracket, wherein said first and second rods diverge rearward and away from said stud bolt and terminate adjacent to said passenger seat.

4. The bicycle passenger seat of claim 1, wherein said passenger handles are registered orthogonal to the x-axis and remains disposed anterior of said first and second rods respectively.

5. The bicycle passenger seat of claim 1, wherein said support frame further comprises: an adjustable vertical frame section adjustable along the y-axis, said adjustable vertical frame section comprising
   a bottom end having first and second support beams directly and statically connected to said first and second rods of said posterior end respectively, said first and second support beams extending rearwardly away from said posterior end and along the y-axis; and
   an upper end having first and second poles telescopically interfitted directly within said first and second beams respectively, said first and second poles extending upwardly from said first and second beams.

6. The bicycle passenger seat of claim 5, wherein said first and second poles are directly coupled to said passenger seat.

7. A bicycle passenger seat for assisting a passenger to sit behind an operator of an existing bicycle, said bicycle passenger seat comprising:
   a mounting bracket adapted to be attached to an existing pole of an operator seat pole of the existing bicycle;
   a support frame pivotally attached to said mounting bracket and adapted to be selectively coupled to an axle of a rear wheel of the existing bicycle;
   a stud bolt removably connected to said support frame;
   a plurality of passenger handles removably attached to axially opposed ends of said stud bolt; and
   a passenger seat coupled to a posterior end of said support frame;
   wherein a horizontal length of said support frame is selectively adjustable along an x-axis and a vertical length of said support frame is selectively adjustable along a y-axis;
   wherein said support frame comprises: an adjustable horizontal frame section adjustable along the x-axis, said adjustable horizontal frame section comprising
   an anterior end having first and second tubular shafts directly and pivotally connected to said mounting bracket such that said anterior end is selectively pivoted above and below the x-axis, said anterior end extending rearward from said mounting bracket along the x-axis; and
   a posterior end having first and second tubular rods telescopically interfitted directly within said first and second shafts respectively, such first and second rods extending rearward from said first and second shafts and along the x-axis;
   wherein said stud bolt traverses through said first and second shafts and said first and second rods respectively.

8. The bicycle passenger seat of claim 7, wherein said passenger handles are situated intermediately between said mounting bracket and said passenger seat.

9. The bicycle passenger seat of claim 7, wherein said first and second shafts diverge rearward and away from said mounting bracket, wherein said first and second rods diverge rearward and away from said stud bolt and terminate adjacent to said passenger seat.

10. The bicycle passenger seat of claim 7, wherein said passenger handles are registered orthogonal to the x-axis and remains disposed anterior of said first and second rods respectively.

11. The bicycle passenger seat of claim 7, wherein said support frame further comprises: an adjustable vertical frame section adjustable along the y-axis, said adjustable vertical frame section comprising a bottom end having first and second support beams directly and statically connected to said first and second rods of said posterior end respectively, said first and second support beams extending rearwardly away from said posterior end and along the y-axis; and an upper end having first and second poles telescopically interfitted directly within said first and second beams respectively, said first and second poles extending upwardly from said first and second beams.

12. The bicycle passenger seat of claim 11, wherein said first and second poles are directly coupled to said passenger seat.

* * * * *